W. W. & F. B. MIX.
Dust-Pan.
No. 213,232. Patented Mar. 11, 1879.
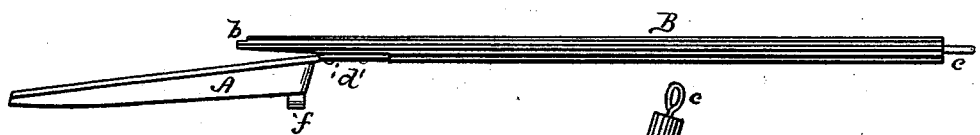
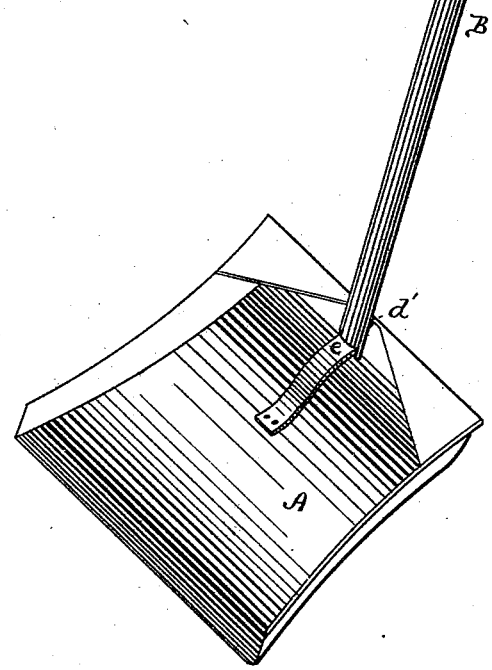

UNITED STATES PATENT OFFICE.

WALTER W. MIX AND FRANK B. MIX, OF ATLANTA, ILLINOIS.

IMPROVEMENT IN DUST-PANS.

Specification forming part of Letters Patent No. 213,232, dated March 11, 1879; application filed January 28, 1879.

*To all whom it may concern:*

Be it known that we, WALTER W. MIX and FRANK B. MIX, of Atlanta, in the county of Logan and State of Illinois, have invented a new and valuable Improvement in Dust-Pans; and we do hereby declare that the following is a full, clear, and exact description of the construction and operation of the same, reference being had to the annexed drawings, making a part of this specification, and to the letters and figures of reference marked thereon.

In the accompanying drawings, in which similar letters of reference indicate like parts, Figure 1 is a lateral view of a device embodying our invention. Fig. 2 is a perspective of the same.

Our invention relates to an improvement in dust-pans for domestic purposes; and it consists in such construction and arrangement of its parts as enables the dust to be collected into the pan without necessitating stooping on the part of the person collecting the same, and in the adjustable upright handle B, the spring $e$, and the strap-hinge $d'$, in connection with the handle B and the pan A.

The handle B is provided with the metallic eye $c$, vertically secured therein for hanging up the pan when not in use, and the notch $b$, for reception of the spring $e$, and it is pivoted to the pan by means of the strap-hinge $d'$, whereby the pan may be held in close contact with the dust to be removed.

The spring $e$, which clutches in the notch $d'$ of the handle B at right angles to the pan, retains the handle in an upright or vertical position; but by depressing the spring with the foot the handle may be thrown back again in a line with the pan, and the device may thus be suspended by the eye $c$ from a nail in the wall.

To the pan A is soldered the longitudinal spring $e$ and the feet $f$, which latter are designed for the purpose of tilting the pan closely to the floor at the front, where, in practice, it is brought into a vertical position, in order that the operator may, by holding the handle at its apex in such position, with facility move the pan into contact with the dust to be removed without the strain and inconvenience of stooping to the floor. This construction also admits the pan and handle to be thrown into a position longitudinal to each other, and the pan to be thus suspended on the wall out of the way.

What we claim is—

1. The handle B, pivoted by strap-hinge $d'$, and adjusted by spring $e$, for securing the handle B at right angles to pan A, substantially as shown and described.

2. The combination of the handle B, having eye $c$, strap-hinge $d'$, spring $e$, and pan A, with feet $f$, substantially as shown and described.

In testimony that we claim the above we have hereunto subscribed our names in the presence of two witnesses.

WALTER W. MIX.
FRANK B. MIX.

Witnesses:
EDMUND HILL,
J. L. BEVAN.